Patented Nov. 1, 1927.

1,647,749

UNITED STATES PATENT OFFICE.

JOHN JAY REYNOLDS, OF NEW YORK, N. Y.

FOOD PRODUCT.

No Drawing.   Application filed November 8, 1924.   Serial No. 748,526.

This invention relates to the protection of foodstuffs from mold and the like and particularly to the treatment of the surface of a foodstuff so as to preserve it from deterioration.

Prior methods of preserving foodstuffs have been objectionable not only because of their expense and limited effectiveness but also because of their effect on the taste or appearance of the goods.

The object of this invention is to provide a process of preserving foodstuffs which will be inexpensive and thoroughly effective to prevent molding or surface deterioration or the like and which will at the same time have no objectionable effect on the appearance or taste of the foodstuff to which it is applied.

Preferably the preserving process is applied to the surface layer of the foodstuff and comprises the impregnation of the surface with a neutral mineral oil to a depth depending upon the nature of the material and the form in which it is treated.

In connection with cheese, for instance, while there have been various prior attempts to prevent molding those have been ineffective in practice as the surface could not be properly protected without undesirably affecting the cheese itself.

According to the method of my invention the cheese after pressing and drying has its surface impregnated with a tasteless, odorless mineral oil applied either by brushing, spraying or dipping. The cheese absorbs the oil into its surface to a depth determined by the time of treatment and the viscosity of the oil.

The oil used is preferably a mineral oil conforming to the specification of U. S. P. medicinal oil. A viscosity of 150 (Saybold) has proven satisfactory and a gravity of .828 to .905 (Saybold). This surface layer of oil impregnated cheese protects the entire cheese from bacteria and molding and greatly retards shrinkage by preventing evaporation and hardening and it thus keeps the cheese fresh. The oil also kills off any mold at the surface so that the process of this invention may be used with cheese already showing mold.

Since the oil is tasteless and harmless its presence is unobjectionable and in fact it greatly improves the cheese in preventing it from becoming stale and in maintaining its fresh appearance. The process is particularly applicable to foodstuffs such as cheese having a porous surface which readily receives and absorbs the oil throughout a surface skin or layer and thus holds the oil in this protective surface film.

The process of this invention may also be applied to meats such as hams, bacon, Bolognas and the like and to fruits and vegetables. The results in all cases being the same in killing and preventing mold and bacterial growth and protecting the interior parts from evaporation. All that is required in the practice of this process is the application of the mineral oil in liquid form to the surface of the food. It is not necessary to use heat or to wait for the preservative to cool or dry. The oil remains permanently fluid and its tasteless, colorless nature in no wise detracts from the appearance or taste or value of the food; on the contrary all of these characteristics of the food are distinctly improved by the treatment.

Instead of applying the preserving oil directly to the surface of the foodstuff it may in some cases be preferable to apply the oil in a wrapping of paper or other material. This oil may be incorporated in paper, for instance, in any desired manner while the paper is in pulp form or in sheet form and the oiled paper will then serve as the preserving wrapping as a protection against mold and evaporation. The oil may be incorporated in the paper in such quantity as to provide an excess. In such case the foodstuff coming in contact with its wrapper will absorb some of this excess oil providing a combined protection of the wrapper and the surface film of oil on the foodstuff. This oil may be added to the paper without heating or requiring any extensive special treatment and its effect is to make the paper more flexible and pliable, translucent and tough and at the same time renders the paper waterproof without undesirably stiffening it and changing its appearance as prior waterproofing substances such as paraffin has done.

I claim:

A prepared food comprising a cheese having a surface layer impregnated with a substantially invisible, odorless, tasteless mineral compound covering the cheese as a thin film at ordinary temperatures between 32° and 100° F. and permeating it in sufficient quantity so as to close the pores of the cheese and stop any molding and protect it against further molding.

JOHN JAY REYNOLDS.